(12) United States Patent
Senet

(10) Patent No.: US 8,156,966 B2
(45) Date of Patent: Apr. 17, 2012

(54) ANIMAL RESISTANT TUBING SYSTEM

(75) Inventor: Bradley Senet, Sherman Oaks, CA (US)

(73) Assignee: Senet Partners, LLC, Los Angeles, CA (US)

( * ) Notice: Subject to any disclaimer, the term of this patent is extended or adjusted under 35 U.S.C. 154(b) by 1034 days.

(21) Appl. No.: 12/105,691

(22) Filed: Apr. 18, 2008

(65) Prior Publication Data

US 2009/0260704 A1    Oct. 22, 2009

(51) Int. Cl.
*F16L 57/00* (2006.01)
*F16L 11/00* (2006.01)
*B29C 53/58* (2006.01)

(52) U.S. Cl. ........ 138/110; 138/129; 138/134; 138/137; 138/139; 156/143

(58) Field of Classification Search .................. 138/110, 138/129, 134, 135, 137, 139; 156/143, 195
See application file for complete search history.

(56) References Cited

U.S. PATENT DOCUMENTS

| | | | | |
|---|---|---|---|---|
| 2,166,448 A * | 7/1939 | Schuknecht et al. | .......... | 285/116 |
| 2,185,741 A * | 1/1940 | Sorg et al. | .......... | 285/115 |
| 2,540,203 A * | 2/1951 | Hatcher, Sr. | .......... | 285/115 |
| 3,623,513 A * | 11/1971 | Dinkelkamp | .......... | 138/114 |
| 4,001,918 A * | 1/1977 | Moore | .......... | 24/16 R |
| 4,459,168 A | 7/1984 | Anselm | | |
| 5,582,212 A | 12/1996 | Tanzosh | | |
| 5,624,074 A | 4/1997 | Parisi | | |
| 5,988,226 A * | 11/1999 | Matthews | .......... | 138/109 |

* cited by examiner

*Primary Examiner* — Len Tran
*Assistant Examiner* — Ryan Reis
(74) *Attorney, Agent, or Firm* — SoCal IP Law Group LLP; Steven C. Sereboff; John E. Gunther

(57) ABSTRACT

There is disclosed an animal-resistant tubing system. The animal resistant tubing system may include a flexible tube disposed within a coil shield, the coil shield having an uncompressed length longer than a length of the flexible tube. The coil shield may have an inside diameter larger than an outside diameter of the flexible tube. The entire length of the coil shield may be free to move radially, axially and rotationally about the flexible tube except that the first and second fittings may prevent the coil shield from moving axially beyond the ends of the flexible tube, such that the length of the coil shield is compressed between the first fitting and the second fitting.

16 Claims, 5 Drawing Sheets

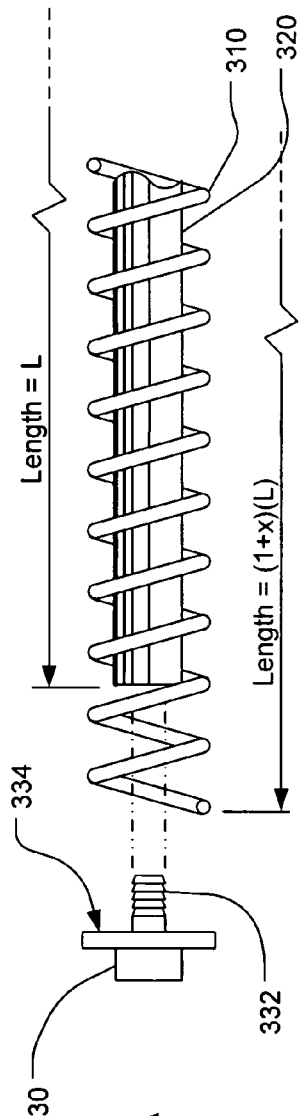
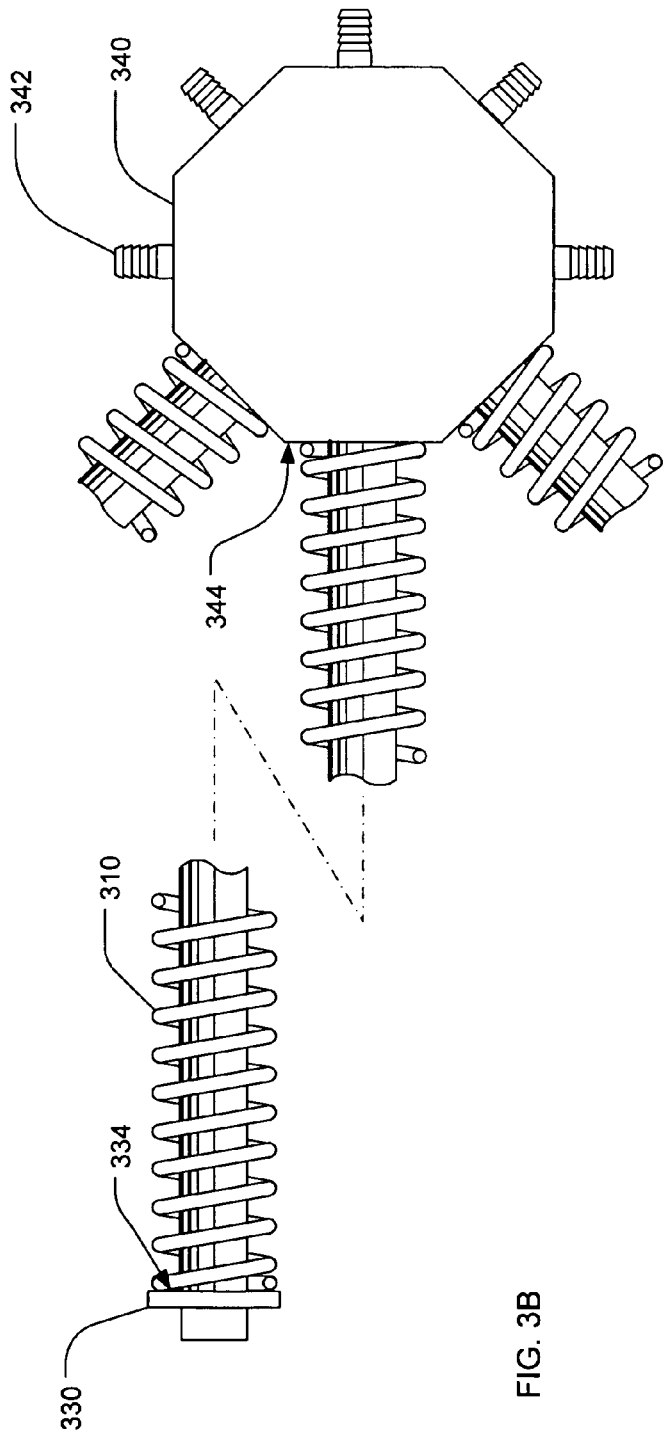

ANIMAL RESISTANT TUBING SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to an animal-resistant tubing system for use in irrigation systems and other applications.

2. Description of the Related Art

A desire to conserve water has resulted in wide use of drip irrigation systems and other irrigation systems that deliver water directly and exclusively to the root zones of plants. Irrigation systems that deliver water directly to plants are used for both decorative landscaping and for orchards and other commercial farming.

Irrigation systems currently use a variety of types of small-diameter flexible plastic tubing to carry water to the plants to be watered. Such tubing is subject to damage from animals including rodents, skunks, rabbits, dogs, and birds. Such animals may be seeking water, may have an instinctive need to chew on hard objects, may be curious, or may simply be bored. Chewing may lead to punctures of the plastic tubing. Punctures may, in turn, lead to inefficient use of water and possible damage to plants that may be deprived of water.

DESCRIPTION OF THE DRAWINGS

FIG. 3A is a side view of one end of an exemplary tubing section prior to assembly.

FIG. 3B is a side view of the exemplary tubing section after assembly.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
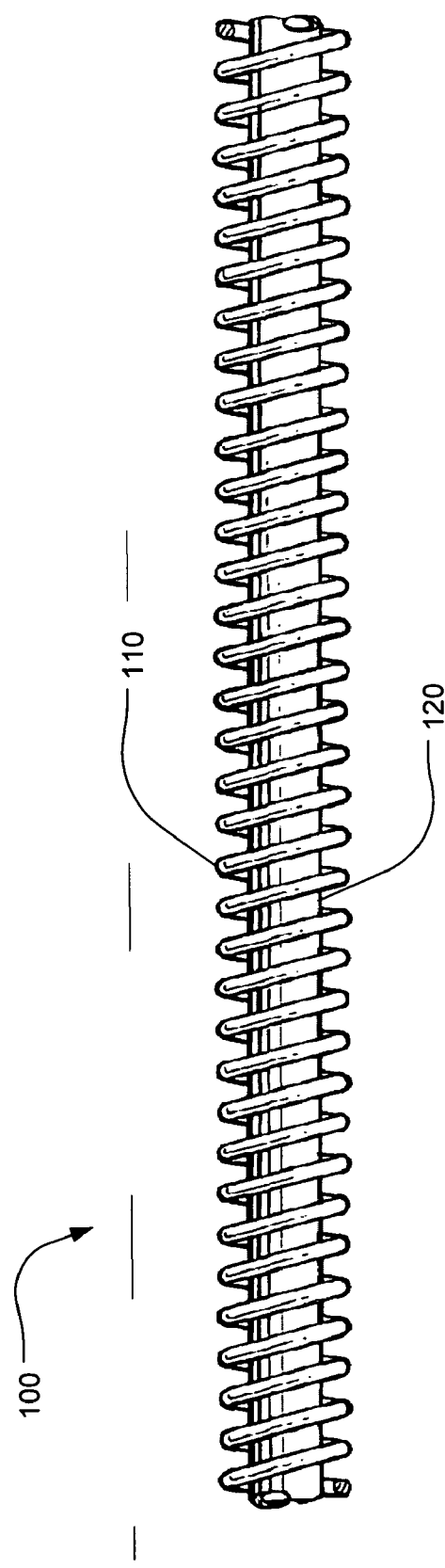
FIG. 1 is a side view of an animal-resistant tubing system.

Referring now to FIG. 1, an animal-resistant tubing 100 system may include a flexible tube 120 within a spiral-wound coil shield 110. The flexible tube 120 may be made of polyethylene, polyurethane, polyvinylchloride, some other plastic, or some other material suitable to provide a flexible tube. The flexible tube 120 may be made of a material that is resistant to ultraviolet light and otherwise suitable for outdoor use.

The coil shield 110 may be formed of a wire wound in a spiral form. The coil shield 110 may be fabricated from a metal wire such as stainless steel; plated, galvanized, or coated steel; or other corrosion-resistant metal material. The coil shield may be formed of a non-metallic material such as a carbon fiber or composite fiber. The coil shield 110 may be fabricated of wire or fiber having a circular cross-section, as shown in FIG. 1, or may be fabricated from wire or fiber having a square or other non-circular cross section.

Figure 2:
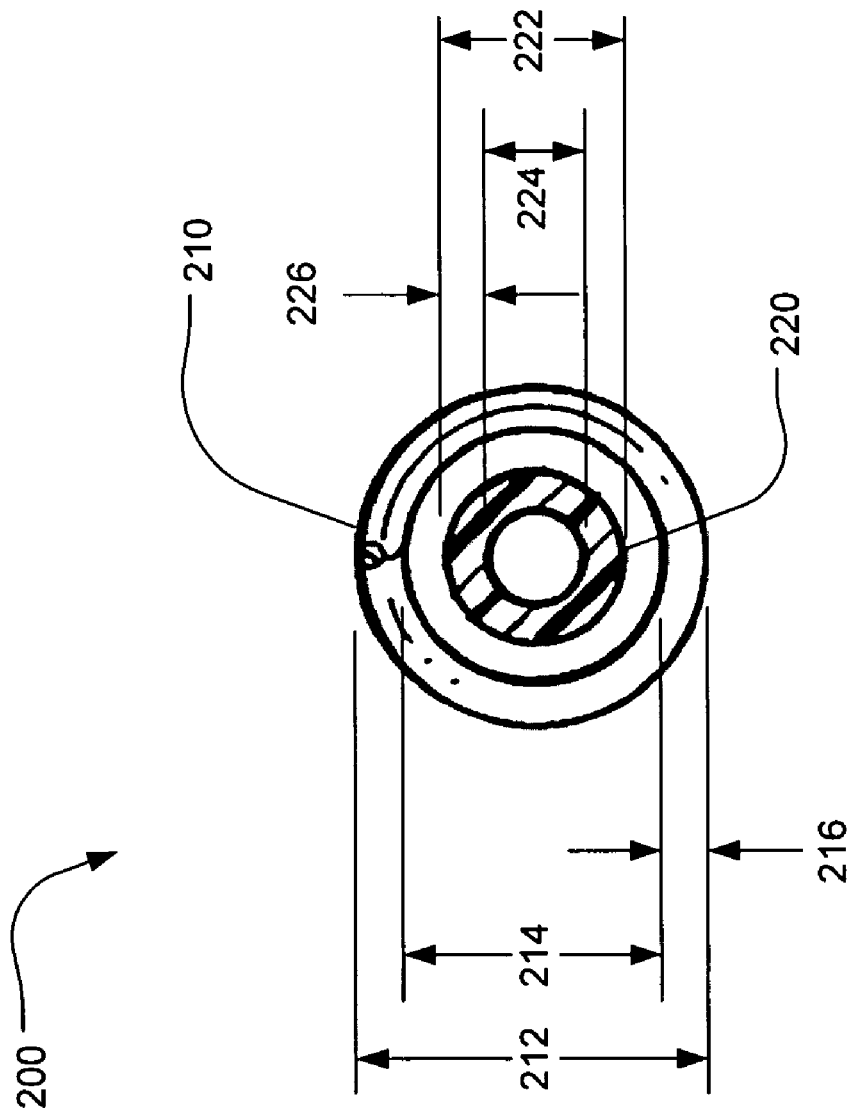
FIG. 2 is an end view of an animal-resistant tubing system.

Referring now to FIG. 2, an animal-resistant tubing system 200, which may be the tubing system 100, may include a flexible tube 220 having an outside diameter 222 and wall thickness 226. The animal-resistant tubing system 200 may use a variety of sizes of flexible tubes 220. The outside diameter 222 may be from 0.180" to greater than 1.00". The wall thickness 226 may be selected, given the shape and material of the flexible tube, such that the flexible tube is able to contain the maximum foreseeable water pressure. The wall thickness 226 may be from 0.030" to 0.0625" or greater. The flexible tube 220 may have an inside diameter 224 equal to the outside diameter 222 less twice the wall thickness 226. The outside diameter 222 and the wall thickness 226 of the flexible tube 220 may be selected such that the inside diameter 224 is sufficient to carry a desired flow of water for irrigation. The inside diameter may be from 0.118" to 1.00" or greater.

The flexible tube 220 may be disposed within a coil shield 210 having an outside diameter 212 and wire diameter 216. The wire diameter 216 may be selected to provide sufficient strength to resist the teeth of the animals that may chew the irrigation tubing. The wire diameter may be from 0.030" to 0.0625". The outside diameter 212 of the coil shield 210 may be selected such that the inside diameter 214 of the coil shield is larger than the outside diameter 222 of the flexible tube 220.

FIG. 2 shows the flexible tube 220 centered within, and concentric with, the coil shield 210. However, the flexible tube 220 may not be attached to the coil shield 210 such that the coil shield 210 may be free to move radially with respect to the flexible tube, within the constraints of the inner diameter 214 of the coil shield 210. The coil shield 210 may also be free to rotate about the flexible tube 220 and to move axially along the length of the flexible tubing. The flexible tube 220 may not be attached to the coil shield 210 at any point along the length of the flexible tube 220. The coil shield 220 may be free floating around the flexible tube 220.

An animal-resistant tubing system such as the tubing system 100/200 may deter chewing animals in several ways. First, small rodents (mice, moles, etc.) may not be able to open their mouths sufficiently to effectively chew on the outside of the coil shield 110/210. Larger rodents, rabbits, and the like may be able to chew unproductively on the outside of the coil shield 110/210 but their large incisors may not be able to penetrate between the adjacent turns of the coil shielding. The center-to-center spacing of the adjacent turns of the coil shield 110/210 may be less than 0.150" or some other dimension suitable to minimize the penetration of animal teeth. Other animals (skunks, foxes, dogs, raccoons, etc.) may be able to force their pointed canine teeth between the turns of the coil shield 110/210 but may not be able to penetrate the flexible tubing 120/220 since the coil shield 110/210 is free to move radially, axially and rotationally about the flexible tube 120/220.

FIG. 3A shows components of an animal resistant tubing system, which may be the animal resistant tubing system 100 or 200, prior to assembly. A section of flexible tube 320 may have a first length L. The length L may be selected, for example, to run between a water source and a plant to be watered by an irrigation system. A section of coil shield 310 may have a second length longer than the first length L. The second length may be equal to (1+x)(L), where x is a predetermined number. The number x may be a compression factor that indicates the relative amount that the length of the coil shield 310 will be compressed when the animal resistant tubing system is assembled. The number x may be, for example 0.05 to 0.2 or greater, such that the length of the coil shield 310 may be compressed by 5% to 20% or more when the animal resistant tubing system is assembled.

Each end of the section of flexible tube 320 may be connected to a fitting. In this patent, the term "fitting" is intended to mean any device that can be connected to or coupled to an end of a section of flexible tube. For example, one end of the flexible tube 320 may be connected to a drip head such as the drip head 330 shown in FIG. 3A. The drip head 330 may include a barbed nipple that may be inserted into, and retained by, an end of the section of flexible tube 310. The drip head 330 may include a flange 334 having a diameter greater than the outside diameter of the metal coil shield 310.

FIG. 3B shows the section of flexible tube 320 with both ends of the flexible tube connected to fittings. The first end of the flexible tube 320 may be connected to the drip head 330. The second end of the flexible tube 320 may be connected to a distribution manifold, or "octopus", 340. The distribution manifold 340 may receive water from a supply pipe (not shown) and may supply water to a plurality of flexible tubes such as the flexible tube 320. The distribution manifold may include a plurality of male couplings, such as the barbed nipples 342 shown in FIG. 3B, or may include a plurality of female fittings to accept the ends of a corresponding plurality of flexible tubes.

FIG. 3B shows that a first end of the coil shield 310 may be in contact with the flange 334 of the drip head 330, and a second end of the coil shield 310 may be in contact with a face 344 of the distribution manifold 340. The presence of the flange 334 and the face 344 may prevent the ends of the coil shield 310 from extending past the ends of the flexible tube 320. Since the initial length of the coil shield 310 may be longer than the length of the flexible tube 320 by a factor of (1+x), the length of coil shield 310 may be compressed between the flange 334 and the face 344. The spring tension resulting from the compression of the coil shield 310 may cause the two ends of the coil shield 310 to press firmly against the flange 334 and the face 344. The spring tension may thus prevent chewing animal from gaining access to the flexible tube at the point of connection between the flexible tube and the fittings. To provide spring tension to prevent chewing animal from gaining access to the flexible tube, the compression factor x may be 0.05 or greater. The compression factor x may be from 0.05 to 0.20. The compression factor x may be about 0.10.

The drip head 320 and the distribution manifold 340 are examples of the types of fittings that may be connected to each end of a section of flexible tube 320. The fittings at each end of a section of flexible tube may be separately selected from drip heads and spray heads that emit water at predetermined rates such as 0.5, 1.0, and 2.0 gallons per hour or other rates; straight, "Tee", "Y", elbow, cross, and other connectors to connect the flexible tube 320 to one or more similar flexible tubes; connectors to connect the flexible tube 320 to tubes, pipes, or hoses of other diameters; distribution manifolds, such as the distribution manifold 340, that supply water to a plurality of flexible tubes; and other devices connectable to an end of a flexible tube. Each type of fitting may be effective to compress a coil shield surrounding a flexible tube connected to the fitting. Thus, each type of fitting may include a flange, shoulder, face, or other structure that prevents a coil shield from extending past the end of the flexible tube connected to the fitting.

Figure 4:
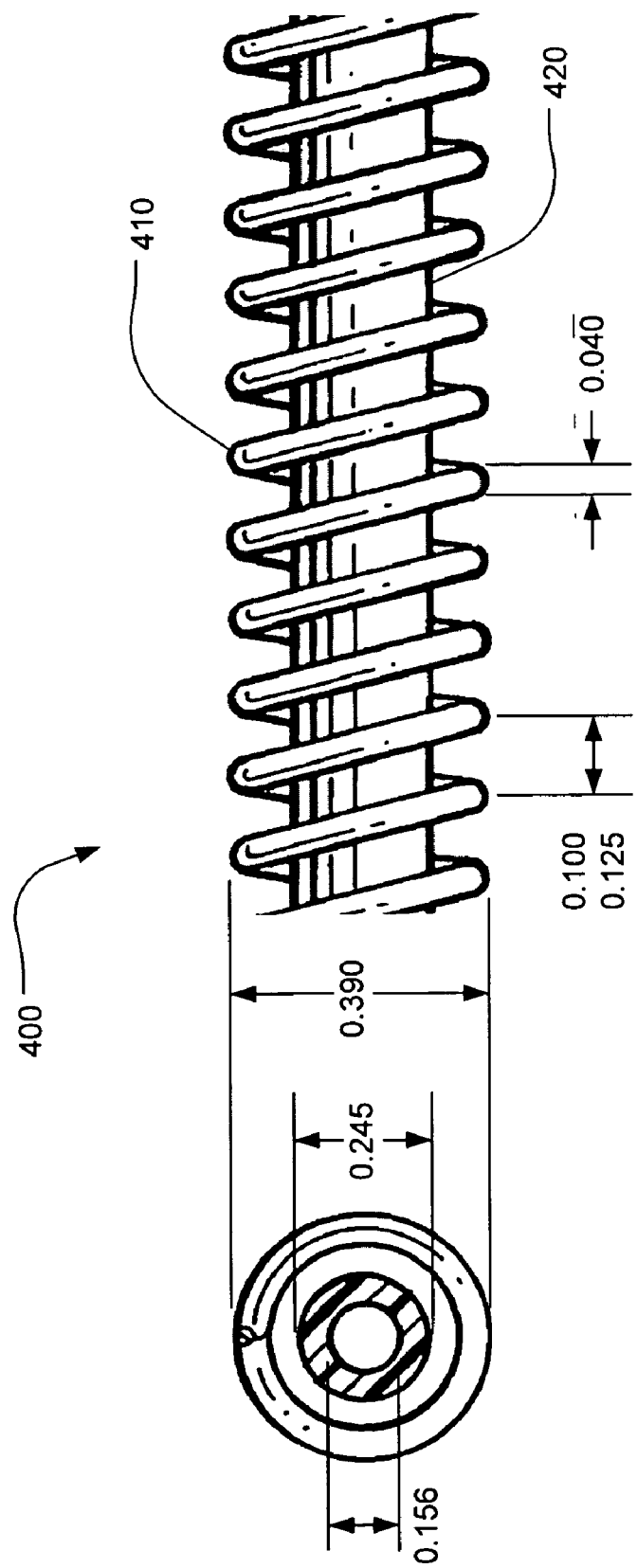
FIG. 4 is a dimensioned side view of an animal-resistant tubing system with a coil shield.

Referring now to FIG. 4, an exemplary embodiment of an animal-resistant tubing system 400 may include a flexible tube 420 having a nominal inside diameter of 0.156" and a nominal outside diameter of 0.245". With this description, the term "nominal" is intended to encompass normal manufacturing tolerances, which may be +0.005" or +0.010", and minor dimensional variations. In this case, the dimensions of the flexible tube 420 are intended to include any "¼ inch" drip irrigation tubing that is compatible with commonly available "¼-inch" fittings.

The flexible tube 420 may be enclosed by a coil shield 410 having a nominal outside diameter of 0.390". The coil shield 410 may be fabricated from wire having a nominal diameter of 0.040", such that the nominal inside diameter of the coil shield 310 may be 0.310". The nominal center-to-center spacing of adjacent turns of the coil shield may be from 0.100" to 0.125".

Description of Processes

Figure 5:
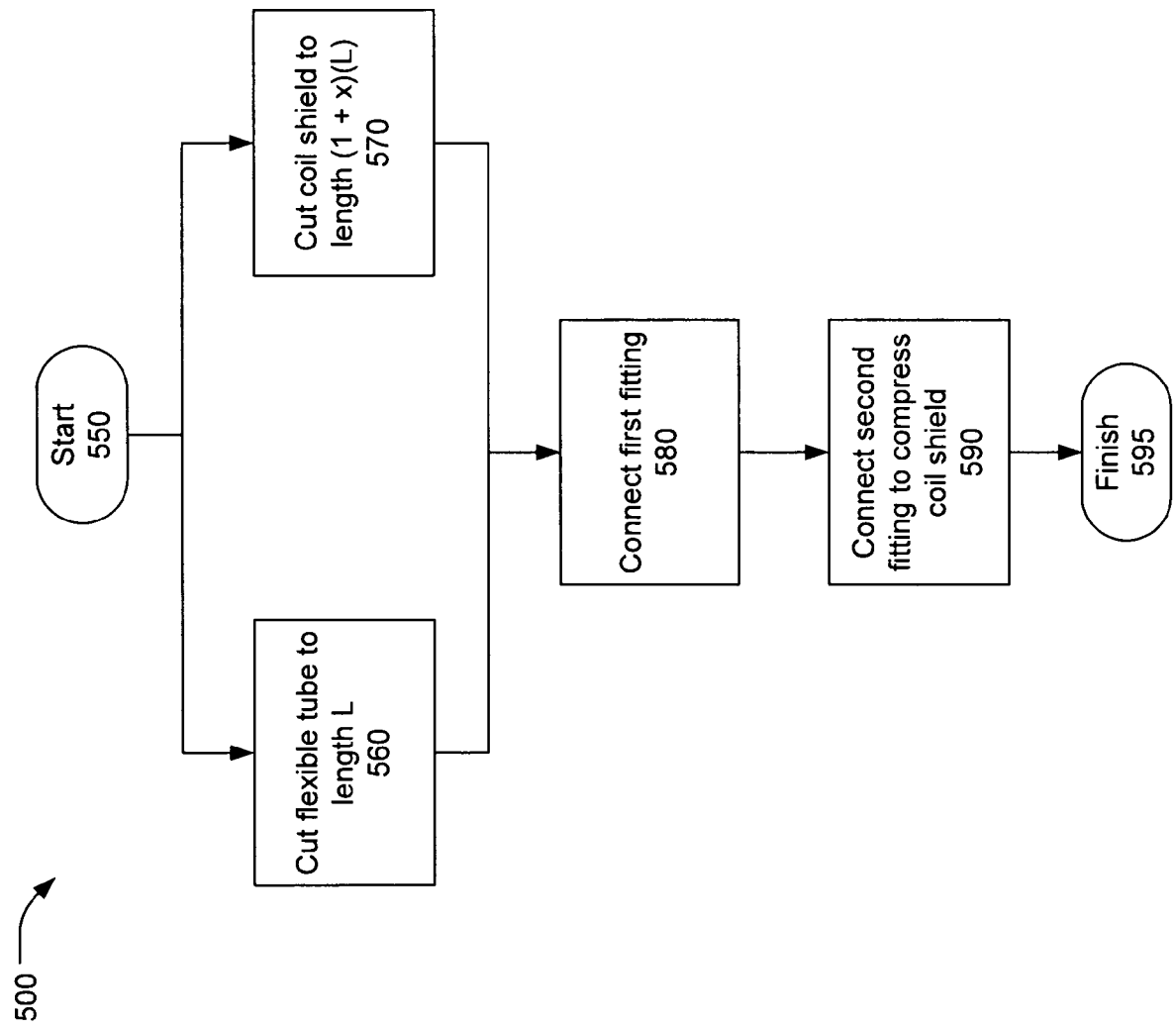
FIG. 5 is a flow chart of a process for installing an animal-resistant tubing system.

Referring now to FIG. 5, a process 500 for installing a section of animal-resistant tubing may start at 550 and finish at 595. It should be understood that the process 500 may be repeated for each segment of tubing in an irrigation system or other application.

At 560, a section of flexible tube having a length L may be cut from a longer length or roll of flexible tube. At 570, a section of coil shield having a length equal to (1+x)(L), where x is a predetermined compression factor, may be cut from a longer length or roll of coil shield. The compression factor x may be from 0.10 to 0.20 or greater. The cutting of the tube and coil shield at 550 and 570 may be done in any order or concurrently.

The flexible tube and the coil shield may be provided on separate rolls and assembled (by sliding the flexible tube into the coil shield) after being cut to the respective lengths. The flexible tube and the coil shield may be preassembled and provide on common rolls with the tubing disposed within the coil shield. In this case, a section of coil shield may be cut to a length (1+x)(L) first. The cut section of coil shield may then be manually compressed such that the tubing within the coil shield may be cut to a length L.

A first fitting may be connected to a first end of the flexible tube at 580. The first fitting may be connected to the first end of the flexible tube before or after the flexible tube and coil shield are cut to the desired lengths.

After the flexible tube and the coil shield are cut to the desired lengths at 560 and 570, and after the first fitting is connected at 580, a second fitting may be connected to a second end of the flexible tube at 590. The length of the coil shield may be compressed from (1+x)(L) to approximately L when the second fitting is connected at 590.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives.

For means-plus-function limitations recited in the claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

It is claimed:

1. An animal-resistant tubing system, comprising: a flexible tube having a first length between a first end and a second end; a coil shield surrounding the flexible tube, the coil shield having a uncompressed length longer than the first length; and first and second fittings engaged with the first and second ends of the flexible tube respectively, wherein the entire length of the coil shield is free to move radially, rotationally, and axially with respect to the flexible tube except that the first and second fittings prevent the coil shield from moving axially beyond the ends of the flexible tube, such that the length of the coil shield is compressed between the first fitting and the second fitting.

2. The animal-resistant tubing system of claim 1, wherein the coil shield is formed of metal wire having a nominal wire diameter from 0.030" to 0.0625".

3. The animal-resistant tubing system of claim 1, wherein the flexible tube has a nominal outside diameter from 0.187" to 1.07" and a wall thickness from 0.030" to 0.0625".

4. The animal-resistant tubing system of claim 1, wherein the coil shield is wound in a spiral form with the center-to-center spacing of adjacent turns equal to or less than 0.150".

5. The animal-resistant tubing system of claim 1, wherein the flexible tube has a nominal inside diameter of 0.155" and a nominal outside diameter of 0.245"; the coil shield has a nominal outside diameter of 0.390" and a nominal inside diameter of 0.310"; and the coil shield is wound in a spiral form with the center-to-center spacing of adjacent turns between 0.100" and 0.125".

6. The animal-resistant tubing system of claim 1, wherein the coil shield has an inside diameter larger than an outside diameter of the flexible tube, and the flexible tube and the coil shield are not attached at any point along a length of the flexible tube.

7. The animal-resistant tubing system of claim 1, wherein the coil shield is formed of metal wire having a wire diameter sufficient to resist compression by the teeth of a chewing animal, and the coil shield is wound in a spiral form with the space between adjacent turns sufficiently small to minimize direct contact between the teeth of a chewing animal and the flexible tube.

8. The animal-resistant tubing system of claim 1, wherein the first fitting and the second fitting are separately selected from the group consisting of drip heads, spray heads, couplers, and distribution manifolds.

9. The animal-resistant tubing system of claim 1, wherein the uncompressed length of the coil shield is at least 5% longer than the first length.

10. The animal-resistant tubing system of claim 1, wherein the uncompressed length of the coil shield is 5% to 20% longer than the first length.

11. The animal-resistant tubing system of claim 1, wherein the uncompressed length of the coil shield is about 10% longer than the first length.

12. A method of installing an animal-resistant tubing system, comprising: cutting a flexible tube to a first length; cutting a coil shield to an uncompressed length longer than the first length; sliding the flexible tube within the coil shield; installing a first fitting to a first end of the flexible tube; and installing a second fitting to a second end of the flexible tube, wherein the entire length of the coil shield is free to move radially, rotationally, and axially with respect to the flexible tube except that the first and second fittings prevent the coil shield from moving axially beyond the ends of the flexible tube, such that the length of the coil shield is compressed between the first fitting and the second fitting.

13. The method of installing an animal-resistant tubing system of claim 12, wherein the uncompressed length of the coil shield is at least 5% longer than the first length.

14. The method of installing an animal-resistant tubing system of claim 12, wherein the uncompressed length of the coil shield is 5% to 20% longer than the first length.

15. The method of installing an animal-resistant tubing system of claim 12, wherein the uncompressed length of the coil shield is about 10% longer than the first length.

16. The method of installing an animal-resistant tubing system of claim 12, wherein the flexible tube is assembled within the coil shield before cutting the flexible tube and the coil shield to the respective lengths.

* * * * *